United States Patent [19]

Firth

[11] 4,360,456

[45] * Nov. 23, 1982

[54] KNEADABLE MASTIC COMPOSITION COMPRISED OF EPOXY RESIN AND AROMATIC CURING AGENT

[75] Inventor: Francis G. Firth, Los Angeles, Calif.

[73] Assignee: Applied Plastics Co., Inc., El Segundo, Calif.

[*] Notice: The portion of the term of this patent subsequent to May 26, 1998, has been disclaimed.

[21] Appl. No.: 208,471

[22] Filed: Nov. 13, 1980

Related U.S. Application Data

[62] Division of Ser. No. 19,266, Mar. 9, 1979, Pat. No. 4,269,751.

[51] Int. Cl.$^3$ .................. C08L 63/00; C08L 6/20
[52] U.S. Cl. .................... 523/456; 525/406; 528/124; 525/507; 523/455; 524/906
[58] Field of Search ............... 525/496, 510; 260/33.4 EP

[56] References Cited

U.S. PATENT DOCUMENTS

| | | | |
|---|---|---|---|
| 2,511,913 | 6/1950 | Greenlee | 525/510 |
| 3,446,773 | 5/1969 | Schwarz | 525/510 |
| 3,600,362 | 8/1971 | Hirosawa | 525/510 |
| 3,837,981 | 9/1974 | Flent | 161/36 |
| 4,026,858 | 5/1977 | Andrews et al. | 260/30.2 |
| 4,101,459 | 7/1978 | Andrews | 260/18 EP |
| 4,116,742 | 9/1978 | Firth | 156/289 |

*Primary Examiner*—William F. Hamrock
*Assistant Examiner*—Peter F. Kulkosky
*Attorney, Agent, or Firm*—William W. Haefliger

[57] ABSTRACT

A two component epoxy resin and curing means therefor in mastic compositions, shelf stable, in close side by side relationship, sharing the same environment, capable of ambient temperature curing, to a solid state when mixed in the correct proportions, such stability provided by low vapor pressure active ingredients, and the absence of reactive vapors in the curing means.

9 Claims, No Drawings

KNEADABLE MASTIC COMPOSITION COMPRISED OF EPOXY RESIN AND AROMATIC CURING AGENT

This is a division, of application Ser. No. 19,266, filed Mar. 9, 1979 now U.S. Pat. No. 4,269,751.

BACKGROUND OF THE INVENTION

This invention relates to two component, epoxy resin systems curable at room temperatures, and more specifically to compositions of the mutually reactive epoxy resin and hardener components, as employed in particular mastic, or putty formulations, where the two components are packaged in close side by side relationship, in the form of bars or tapes. Further, the invention relates to shelf stable, plural component, epoxy resin systems, in a mastic, palpable form, suitable for convenient mixing, by hand or machine means, and, after mixing, curable to a solid state in a short time, without the application of external heat.

Epoxy resins can be cured under room temperature conditions, by admixture with a wide variety of chemicals that are capable of opening the oxirane ring, and developing a polymeric structure. Such curing agents are well known, and the stochiometry for optimum concentrations well established in the patent literature, text books, and numerous articles. The subject of curing agents is comprehensively dealt with in, "Handbook of Epoxy Resins" by Lee and Neville, McGraw-Hill Company, Chapters 5 to 12 inclusive.

From a practical view point, however, in the commercial or consumer market for room temperature curing epoxy systems, in the form of palpable mastics, a number of critical factors affect the decisions as to the composition of the systems. In particular, such factors are important when the mastic is designed for probable hand mixing, and is in the form of bars or tapes, in close side by side relationship, confined in a closed container, and/or packaged upon or between film.

Because of the practical desirability of polymerization at ambient temperatures after mixing, it is required that a high degree of mutual reactivity be maintained prior to and during polymerization. High molecular weight epoxy resins, or amine hardeners, generally have less reactive sites than lower molecular weight materials, and are thereby very slow to cure without supplemental heat. Traditionally, practical materials for the cure of epoxy resins at room temperature have been aliphatic, or alicyclic primary diamines, either alone, adducted with epoxy resin, or converted to fatty acid amines by condensation, cyanoethylated, or by other chemical modifications. Lewis acids, or Friedal Craft type catalysts, and adducts as a large class of compounds, can be utilized to cure epoxy resins at ambient temperature, as can some polymeric mercaptans.

Selection of a practical curing agent for a hand mixable, room temperature cure mastic, package in a common environment, requires careful consideration of a number of the properties of the system for commercial practicality, such as:

(a) The unmixed components must have long shelf life in close side by side relationship, sharing the same environment.

(b) Since contact with the bare hands during mixing, or placement of the mixed compound, is typical; any toxicity, irritation potential, sensitization, and offensive odor must be avoided.

(c) After mixing, the mastic must be capable of an application time between several minutes to several hours, and a setup or hardening time of less than eight hours, at ambient temperature.

(d) No staining, and easy removal from the hands are both required.

Presently marketed epoxy mastic systems, with surfaces of the two components exposed to a mutual environment, have a limited shelf life, particularly when exposed to higher temperatures during shipping, and due to poor storage conditions. The curing agent normally employed is based on the aliphatic diamines, and usually is a fatty acid polyamide such as a Genamid or Versamid type, as manufactured by General Mills. Hardeners of these lower molecular weight, liquid, aliphatic, or alicyclic types, release either ammonia, or chemically active amine type vapors, which permeate the common environment of the package, and cause progressive hardening of the epoxy component, which eventually makes mixing extremely difficult, or impossible.

A further problem has to do with the fact that amines with an appreciable vapor pressure, when exposed to air will readily absorb carbon dioxide to form amine carbonates, which are solids, and tend to harden the curing agent to form an unusable mastic.

SUMMARY OF THE INVENTION

These problems have now been overcome by the use of a unique combination of materials which provides an unlimited shelf life, a non-toxic and non-irritating compound, and does not form amine carbonates in the presence of air, or any consequent hardening.

The general solution to the problem resides in the use of a class of aromatic diamines, dissolved in a compatible suitable solvent, to which has been added a synergistic catalyst. The amount of catalyst added, will determine the cure rate of the combination, with the epoxy resin.

Aromatic diamines are mostly solids and will not cure an epoxy resin at ambient temperatures by themselves, but if dissolved in an epoxy resin will advance to a brittle, low melting point state, which requires applications of heat to complete the polymerization.

The mutual solvent provides a vehicle for the catalyst, and prevents the initial solidification, which essentially stops the reaction. The primary requirements for the solvent are those of high boiling point, low vapor pressure, good solvency for the amine and catalyst, compatibility with the epoxy resin and no rejection of the solvent after polymerization. Such characteristics are most easily met by aromatic compounds.

Any polyfunctional epoxy resin, or mixture thereof of aromatic, alicyclic, or aliphatic types, with a low enough viscosity to permit the manufacture of a palpable mastic, can be employed for the resin side of the combination. The main requirements are, that the epoxy component have sufficient functionality, and equivalence, to cure at ambient temperature, with the hardener in the amine component. The resins employed should also not be of a toxic, or irritating nature, when employed in a hand mixing operation.

The aromatic hardener component can be any polyfunctional, aromatic, primary diamine, or a mixture of such amines, with no pendant aliphatic amine chains. A further requirement is that the amine be soluble in the selected aromatic solvent employed in a practical concentration.

Included in the class of useful polyamines are the following: 4-4' diamino diphenyl methane, 3-3' diamino diphenyl methane, 3-4' diamino diphenyl methane, 1,2 diphenylene diamine, 1,3 diphenylene diamine, 1-4 diphenylene diamine, 4-4' diamino diphenyl sulfone, 4-4' diamino diphenyl sulfide, 4-4' tolylene diamine, metaphenylene diamine, ortho phenylene diamine, paraphenylene diamine, 1,3,5 triaminobenzene, 4-4' diamino diphenyl dimethyl methane, and the like.

Disubstituted anilines can be reacted with formaldehyde under acid conditions, to form useful liquid diamines, such as 4,4' methylene bis (2,6 disecondary butyl aniline) and products with other ring substitutions, if desired. A preferred amine is a low molecular weight, semi-liquid, 4,4' methylene dianiline.

Solvents which can be employed in the practice of this invention include alkyl phenols, glycols, glycol ethers, terephenol, aromatic ester plasticizers, and aromatic alcohols. Generally, highly polar solvents with low vopor pressure, low toxicity, and low viscosity, are of value. Two preferred materials are phenyl carbinol and nonyl phenol.

The third reactive ingredient required to promote a cure at ambient temperature, is catalytic in nature, and small percentages are all that are needed. Generally a useful class includes chemicals with available carboxylic acid groups, preferably on an aromatic compound, although this is not necessary since some non-aromatics are also operational. The presence of a hydroxyl group adjacent to the carboxyl is very effective in speeding up the polymerization rate. Examples of useful materials include the following: benzoic acid, 2-hydroxy benzoic acid, 1,2 benzenedicarboxylic acid, 2-naphthalene carboxylic acid, 1-hydroxy 2 naphthoic acid, cinnamic acid, and the like.

Boron trifluoride, and some other Lewis acid catalysts, will promote the ambient temperature cure of liquified aromatic diamines, but have deficiencies under long time storage, due to a hygroscopic nature, and loss of activity with time. The preferred materials are benzoic acid or 2-hydroxy benzoic acid.

EXAMPLE "A"

| EPOXY HARDENER | PARTS (by wt.) |
|---|---|
| Genamid 2000 (General Mills) | 70.0 |
| Dimerized Fatty Acid (Acid Eq. 288) | 12.0 |
| Bisphenol A | 18.0 |
| | 100.0 |

Genamid 2000 and Fatty acid heated to 120° C., Bisphenol A added, and mixture stirred until a clear solution is obtained.

Equivalent weight . . . 104. Viscosity at 25° C. . . . 31,3000 centipoise.

EXAMPLE "B"

| EPOXY HARDENER | PARTS |
|---|---|
| Fatty acid dimer (Eq. wt. 304) | 61.66 |
| Tetraethylene pentamine | 38.34 |
| | 100.00 |

Amine loaded into a closed head reaction kettle, equipped with agitation means, heating, cooling jackets, reflux, take off condensers, and a condensate receiver with vacuum pump.

Warm amine to 50° C. and add fatty acid gradually to kettle maintaining temperature at 65° C.

After addition, raise temperature to 120° C.

25"-26" vacuum is applied to the kettle, and heating continued until the theoretical amount of water is removed. The distillation time was 2 hours with a final temperature reached of 170° C. in the kettle. The water removed was 3.65 parts.

The kettle contents are then cooled to 100° C. and Bisphenol A 15.68 parts is added and dissolved.

Product: Clear light amber liquid. Viscosity at 25° C.,-22,500 centipoise. Amine equivalent weight-92.2

EXAMPLE "C"

Epoxy Hardener

A closed head kettle, equipped with heating and cooling means, a vacuum condenser, agitation, decantation means. Into the kettle was loaded:

| Aniline | 100 parts |
|---|---|
| Water | 100 parts |
| Hydrochloric Acid Conc. | 18 parts |

The acid is added slowly under agitation, with the temperature held at 50° C. Aqueous Formaldehyde 37% 69 parts was added over a period of 1 hour. Kettle temperature was held at 50° C. The temperature was then raised to 95° C. for 2 hours and sodium hydroxide 50% solution was added in a quantity calculated to neutralize the acid catalyst.

The agitation was then turned off, and the organic layer separated. The upper watery layer was decanted, and discarded. After several water washes of the organic layer, the kettle was closed, and under agitation, vacuum stripping at 120° C. for 2 hours dried the product.

Product: A pale, amber, odorless viscous liquid. Viscosity 70,000 centipoise at 25° C. Equivalent weight=53.

This product can be regarded as a typical low molecular weight aniline formaldehyde resin, available commercially, and produced as an intermediate for the production of diisocyanates. The product was further modified as follows:

| Aniline/formaldehyde per above | 43.6 parts |
|---|---|
| Nonyl Phenol | 51.4 parts |
| 2 hydroxy benzoic acid | 5.0 parts |
| | 100.0 parts |

The nonyl phenol is heated to 100° C., and acid dissolved by stirring. The aniline formaldehyde product is heated, and added to the solution, the compatible, low viscosity, clear amber liquid is then cooled to room temperature.

EXAMPLE "D"

Epoxy Hardener 4,4' methylene bis (2 isopropyl aniline) was prepared by substituting 2-isopropyl aniline for aniline in a reaction with formaldehyde similar to Example "C".

The product was a low viscosity, amber liquid, which was further modified according to the following.

| 2-isopropyl aniline/formaldehyde product | 52 parts |

-continued

| phenyl carbinol | 43 parts |
| 3-Phenyl - 2 propenoic acid | 5 parts | to form a liquid.

EXAMPLE "E"

Epoxy Hardener

| Meta phenyline diamine | 24 parts |
| 44' methylene dianiline | 16 parts | are melted together to form a liquid.

| Benzoic acid | 5 parts |
| Dibutyl Phthalate | 55 parts | are heated until the solution is clear and blended with the mixed amines to form a liquid component.

EXAMPLE "F"

Epoxy Hardener

A liquid composition was made similar to Example "E" except for the substitution of Polyoxy propylene glycol with an average molecular weight of 1000 was substituted for the Dibutyl Phthalate. A liquid was produced.

EXAMPLE "G"

Epoxy Resin Composition

A diglycidyl ether of Bisphenol A commercially available as Shell 828, Dow 331, Ciba 6010 and others was mixed in an intensive mixer, such as a double Sigma heavy duty Baker Perkins, with fillers to form a putty, or dough-like, non-flowable mass. The stiffness is dependent on the filler types, and the resin content. A typical formulation is given below:

| DER 331 | 28 parts |
| 200 Mesh ground limestone | 30 parts |
| Talc | 42 parts |
| | 100 parts |

The product is a white putty like mass, which can retain shape after extrusion, into bars, or ribbons.

EXAMPLE "H"

Epoxy Resin Composition

| Novalac type Dow DEN 438 | 6 parts |
| Bisphenol type Dow DER 331 | 14 parts |
| 1-4 Butanediol diglycidyl ether | 4 parts | were thoroughly blended and heated and to the blend was added, in an intensive mixer, the following fillers:

| Ground limestone | 30 parts |
| Talc | 42 parts |

A putty like mass resulted which was capable of being extruded into shapes.

The epoxy curing agents of examples A to F were severally placed in a Baker Perkins double Sigma mixer, and to each were added fillers of the following composition:

| Hardener component | 25 parts |
| Talc | 35 parts |
| Ground limestone | 40 parts | to produce palpable mastic, putty like materials, with no detectable odor, and upon application of heat, no ammoniacal vapor.

Approximately equal parts of either "G" or "H" epoxy resin mastics, and the hardener mastics were thoroughly blended by hand mixing, until a uniform color was developed, and allowed to set at room temperature.

Depending on the combination, all mixed mastics hardened within a few hours, to a solid, infusible state.

The uncured mixed mastics adhered to surfaces to which they were applied, would satisfactorily fill holes, and could be used for industrial repairs. The cured products could be machined, drilled, filled, and sanded to form useful articles, of a commercial nature.

After mixing by hand, very little residue remained on the hands, and could be completely removed by wiping with a paper towel, and washing with soap and water.

The liquid components of the resin mastic, and the hardener component were tested by application to shaved surfaces of albino rabbits, and after 72 hours the skin surfaces were examined.

| | Toxicity Results |
|---|---|
| EXAMPLE | Liquid Component |
| "A" | Redness and blisters at site |
| "B" | Erytherma and vesicles |
| "C" | No effect |
| "D" | No effect |
| "E" | No effect |
| "G" | No effect |
| "H" | Slight redness |

Stability Testing

The samples of the different hardener mastics were extruded in the form of rectangular cross section bars, as was the epoxy resin mastic.

Equal lengths of the bars were placed a few millimeters apart in sealed containers, and placed in storage at ambient temperature for several months. The same series was also placed in sealed containers, and placed in a 150° F. oven for an accelerated shelf life test.

On a regular schedule, both the ambient temperature samples, and the accelerated test samples, were examined for hardening.

The mixture of the mastics made from Examples "A" and "B" and exposed separately with Resin mastics "G" and "H" had shelf lives at 75° F. of about 7 to 12 months, before cracking, and general hardening set in. In the 150° F. over, all the aliphatic amine samples were unusable within 3 to 5 weeks.

Under the same conditions, exposure of the epoxy resin bars to the same environment, in close association with the aromatic hardener formulations "C", "D", "E", and "F", both in the over and at ambient temperatures developed no changes in the texture, or chemical activity of the exposed surfaces.

After a period of six months in the 150° F. oven, the aromatic hardener samples and the resin mastics were hand blended, and cured satisfactorily.

The above demonstrates the improvements in the state of the art by the present invention, which include:

A. Indefinite shelf life for room temperature cure, mastic systems, in close proximity to each other.

B. No irritation potential, or toxicity, as compared with aliphatic hardened systems.

TABLE I

Comparison of different aromatic amines with without catalyst.

| Hardener Composition | | Aromatic Amine 50 w/w Phenylcarbonol 50 w/w | | | | | | |
|---|---|---|---|---|---|---|---|---|
| Epoxy Composition | | Diglycidyl ether of Bisphenol A Equivalent weight 195 | | | | | | |
| Aromatic Amine | | Methylene Dianiline | | M-Phenylene Diamine | | 2-4 Tolyene Diamine | | Aniline Formaldehyde |
| 2-hydroxy benzoic acid % | 0 | 5% | 0 | 5 | 0 | 5 | 0 | 5 |
| Gel Time 77° F. 30 GM | 20 hr. | 59 min. | 18 hr. | 57 min. | 17 hr. | 57 min. | 20 hr. | 58 min. |
| "B" Stage | yes | no | yes | no | yes | no | yes | no |

TABLE II

Effect of various solvents on curing of epoxy resin with aniline formaldehyde hardener.
Hardener Composition (by weight):

| 4-4' Methylene dianiline | | | 65 parts | |
|---|---|---|---|---|
| Solvent | | | 30 parts | |
| 2-hydroxy benzoic acid | | | 5 parts | |
| Epoxy Component | | Epoxy Novalac 50 Bis A Epoxy 50 | | |
| Solvent | Phenyl Carbinol | Nonyl Phenol | Ethyleneglycol | Dibutyl Phthalate |
| Viscosity of Hardener | low | high | low | medium |
| Gel Time | 58 min | 38 min | 85 min | 61 min |
| B Stage | no | no | no | no |

TABLE III

Effect of different catalysts for aromatic amine hardener.
Hardener Composition (by weight):

| Aniline Formaldehyde | | | 65 parts | | |
|---|---|---|---|---|---|
| Phenyl Carbonol | | | 30 parts | | |
| Acid Catalyst | | | 5 parts | | |
| Resin Component Equivalent Weight: | | | diglycidyl ether Bisphenol A | | |
| Acid Catalyst | Control (none) | 2-hydroxy Benzoic Acid | Benzoic Acid | 1-hydroxy 2-Naphthanic Acid | Phthalic Acid | BF$_3$ |
| Gel Time | 20 hr | 58 min | 2 hr 54 min | 2 hr 20 min | 4 hr 50 min | 34 min |
| B Stage | yes | no | no | no | no | no |

From what has been said, the invention contemplates provision of a hand kneadable system, comprising (a) first and second mastic masses which are kneadable together, (b) the masses extending in close side by side relation, (c) the first mass, consisting of an epoxy resin, (d) the second mass consisting of an aromatic diamine dissolved in a compatible non-hygroscopic solvent, (e) at least one of the masses also containing a catalyst characterized as promoting an ambient temperature cure of the intermixed ingredients of the first and second masses when kneaded together.

The resin in the above system is selected from the group that includes diglycidyl ether of Bisphenol A, phenolic novalac polyglycidyl ether, aliphatic, and aliphatic alicyclic polyglycidyl ether or admixture thereto.

The solvent in the above system is selected from but to limited to the group that includes nonyl phenol, polyterphenyl, polyglycol, polyglycol ether, phenyl carbinol and liquid aromatic ester.

The catalyst in the above system is selected from the group that includes 2-hydroxy benzoic acid, benzene carboxylic acid or derivative; citric acid, 1-2 Benzene dicarboxylic acid, Lewis acid, an aromatic compound with a pendant carbonyl group, and phthalic acid.

The above selections of resin, solvent and catalyst are typical.

I claim:

1. A two component epoxy resin and curing means therefor, shelf stable in close side by side relationship, sharing the same environment being confined in a closed container and packaged upon or between film, capable of ambient temperature curing to a solid state when mixed in the correct proportions, said resin component comprising a bisphenol diglycidyl ether and inert fillers, so combined to form a palpable mastic, the curing means in mastic form, consisting essentially of an aromatic diamine-formaldehyde reaction product, a mutual solvent, inert fillers and a catalyst selected from the group consisting of 2-hydroxy benzoic acid and benzoic acid.

2. The invention of claim 1, wherein the aromatic diamine-formaldehyde component is an aniline-formaldehyde reaction product.

3. The invention of claim 1, wherein the aromatic diamine is a reaction product of a di-substituted aniline and formaldehyde.

4. The invention of claim 1, wherein the catalyst is a 2-hydroxy benzoic acid.

5. The invention of claim 1, wherein the mutual solvent is phenyl carbinol.

6. A two component epoxy resin and curing means therefor, shelf stable in close side by side relationship, sharing the same environment being confined in a closed container and packaged upon or between film, capable of ambient temperature curing to a solid state when mixed in the correct proportions, said resin component comprising a polyfunctioned epoxy resin and inert fillers, so combined to form a palpable mastic, the curing means in mastic form consisting essentially of an aromatic diamine-formaldehyde reaction product, a mutual solvent, inert fillers and a catalyst selected from the group consisting of 2-hydroxy benzoic acid and benzoic acid.

7. The invention of claim 6, wherein the epoxy component is an epoxy Novalac.

8. The invention of claim 6, wherein the epoxy component is an alicylic resin.

9. The invention of claim 6, wherein the epoxy component is a hydantoin resin.

* * * * *